US008941860B2

(12) United States Patent
Kim (10) Patent No.: US 8,941,860 B2
(45) Date of Patent: Jan. 27, 2015

(54) SCANNING METHOD AND SCANNING SYSTEM USING TWAIN DRIVER

(75) Inventor: Dong-koun Kim, Gunpo-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 1110 days.

(21) Appl. No.: 12/047,607

(22) Filed: Mar. 13, 2008

(65) Prior Publication Data

US 2009/0015862 A1 Jan. 15, 2009

(30) Foreign Application Priority Data

Jul. 11, 2007 (KR) .................. 10-2007-0069833

(51) Int. Cl.
*G06F 3/12* (2006.01)
*H04N 1/00* (2006.01)

(52) U.S. Cl.
CPC .... *H04N 1/00204* (2013.01); *H04N 2201/0015* (2013.01); *H04N 2201/0039* (2013.01); *H04N 2201/0041* (2013.01); *H04N 2201/0046* (2013.01); *H04N 2201/0075* (2013.01); *H04N 2201/0081* (2013.01); *H04N 2201/0094* (2013.01)
USPC .......................... 358/1.15; 358/474; 358/505

(58) Field of Classification Search
CPC ...... G06F 3/038; G06F 3/1228; G06F 3/1254; G06F 3/1276; G06F 13/102; G06F 2003/0697; G06F 2009/45583; G06F 1/1696
USPC .............................................. 358/474, 505
See application file for complete search history.

(56) References Cited

U.S. PATENT DOCUMENTS

| 2001/0014908 | A1* | 8/2001 | Lo et al. ................. 709/203 |
| 2003/0101289 | A1 | 5/2003 | Alikberov et al. |
| 2003/0204607 | A1* | 10/2003 | Kakimoto et al. ........... 709/229 |
| 2004/0034862 | A1 | 2/2004 | Kadota |
| 2005/0125576 | A1* | 6/2005 | Yashiki et al. ................. 710/62 |
| 2005/0286080 | A1 | 12/2005 | Lee et al. |
| 2006/0077459 | A1* | 4/2006 | Matsueda .................... 358/1.15 |
| 2006/0085516 | A1* | 4/2006 | Farr et al. ...................... 709/217 |

FOREIGN PATENT DOCUMENTS

| EP | 1 317 126 A2 | 6/2003 |
| JP | 2003-198780 | 7/2003 |

(Continued)

OTHER PUBLICATIONS

Korean Office Action issued Jul. 22, 2011 in corresponding Korean Patent Application 10-2007-0069833.

(Continued)

*Primary Examiner* — Benny Q Tieu
*Assistant Examiner* — Marcellus Augustin
(74) *Attorney, Agent, or Firm* — Staas & Halsey LLP (57) ABSTRACT

A scanning method used to scan documents in a scanning system, the system including a scanner and a user host computer having a technology without an interesting name (TWAIN) driver, the scanner and the user host computer connected by a local interface and a network, includes selecting one of the local interface or the network to connect the scanner and the user host computer; if the network is selected, connecting the TWAIN driver to the scanner via the selected network to control scanning processes of the scanner; and performing scanning according to the selected local interface or the network.

21 Claims, 6 Drawing Sheets

(56) References Cited

FOREIGN PATENT DOCUMENTS

| | | |
|---|---|---|
| JP | 2004-086564 | 3/2004 |
| JP | 2006-139376 | 6/2006 |
| KR | 10-2006-000744 A | 1/2006 |

OTHER PUBLICATIONS

Korean Notice of Allowance dated Mar. 23, 2012 in corresponding Korean Patent Application 10-2007-0069833.

* cited by examiner

| T4NET_DISCOVERY_REQEUST (0x21) | VERSION (2 byte) | HOST IP (6+1 bytes) | HOST PORT (2 bytes) | MODEL NAME (32 bytes) |
|---|---|---|---|---|
| T4NET_DISCOVERY_REPLY (0x22) | VERSION (2 byte) | HOST IP (6+1 bytes) | HOST PORT (2 bytes) | DEVICEID (256 bytes) |
| | | | | MAC (6 bytes) |
| | | | | SET IP (7 bytes) |
| | | | | IPTYPE (1 byte) |
| | | | | ENCRYPTPIN (1 byte) |
| | | | | DUPLEX SUPPORT (1 byte) |
| | | | | LOCATION (51 bytes) |

FIG. 6B

| T4NET_REG_HOST_INFO_REQEUST (0x26) | VERSION (2 byte) | HOST IP (6+1 bytes) | HOST PORT (2 bytes) | REGDELOPTION (1 byte) |
|---|---|---|---|---|
| | | | | USER ID (16 bytes) |
| | | | | PIN NUMBER (32 bytes) |
| T4NET_REG_HOST_INFO_REPLY (0x27) | VERSION (2 byte) | HOST IP (6+1 bytes) | HOST PORT (2 bytes) | SET IP (7 bytes) |
| | | | | STATUS CODE (4 bytes) |

FIG. 6C

| T4NET_REQ_SET_CONN_REQEUST (0x28) | VERSION (2 byte) | HOST IP (6+1 bytes) | HOST PORT (2 bytes) | SET IP (7 bytes) |
|---|---|---|---|---|
| | | | | DATA (8 bytes) |

FIG. 6D

| T4NET_APPLICATION_LIST (0x29) | VERSION (2 byte) | HOST IP (6+1 bytes) | DATA (1118 bytes) |
|---|---|---|---|
| T4NET_APPLICATION_LIST_ACK (0x2A) | VERSION (2 byte) | HOST IP (6+1 bytes) | DATA (8 bytes) |

FIG. 6E

| T4NET_SCAN_CANCEL_EVENT (0x2B) | VERSION (2 byte) | HOST IP (6+1 bytes) | DATA (8 bytes) |
|---|---|---|---|

FIG. 6F

| T4NET_SCAN_REQUEST (0x2C) | VERSION (2 byte) | HOST IP (6+1 bytes) | DATA (15 bytes) |
|---|---|---|---|

FIG. 7

SCANNING METHOD AND SCANNING SYSTEM USING TWAIN DRIVER

CROSS-REFERENCE TO RELATED APPLICATIONS

This application claims all benefits accruing under 35 U.S.C. §119 from Korean Patent Application No. 2007-69833, filed on Jul. 11, 2007 in the Korean Intellectual Property Office, the disclosure of which is incorporated herein by reference.

BACKGROUND OF THE INVENTION

1. Field of the Invention

Aspects of the present invention relate to a scanning method and scanning system using a Technology Without An Interesting Name (i.e., "TWAIN") driver, and more particularly, to a scanning method and scanning system using a TWAIN driver, which can maximize convenience and utility of a scanner by performing duplex scanning in a scanner or a user host computer, which are both in a scanning system wherein the scanner and the user host computer are locally connected by an interface such as a universal serial bus (USB) or a parallel port, or are remotely connected via a network.

Aspects of the present invention also relate to a method and system to transmit a scanned image from a scanner to an application of a user host computer via a network using network session technology and scanning control technology applied in a local connection.

2. Description of the Related Art

Figure 1:
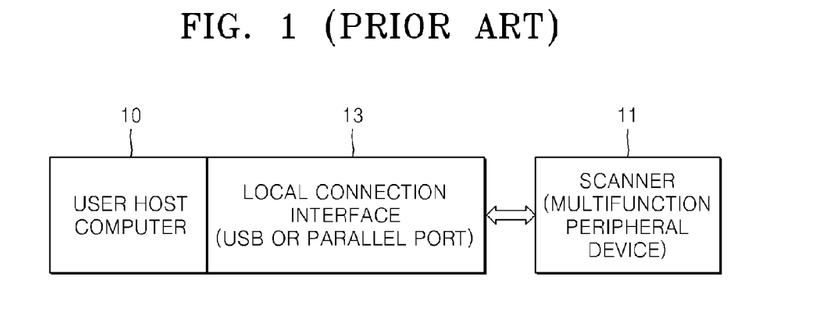
FIG. 1 is a diagram illustrating a connection between a scanner and a user host computer connected by a local connection interface, such as a universal serial bus (USB) or a parallel port.

Generally, a standard interface is used to regulate communication between software applications and imaging devices such as scanners. Examples of such a standard interface are a "Technology Without An Interesting Name" (i.e., "TWAIN") driver, or a Windows image acquisition (i.e, "WIA") driver, used by an application of a user host computer (i.e., a "host") to obtain a scanned image of a scanner. FIG. 1 is a diagram illustrating a connection between a scanner 11 and a user host computer 10 connected by a local connection interface 13, such as a USB or a parallel port. In order for an application of the user host computer 10 to receive an image scanned by the scanner 11 using a TWAIN driver, the local connection interface 13, such as a USB or a parallel port, is usually configured as illustrated in FIG. 1. Such technology is disclosed in U.S. Patent Publication No. 2002/127682.

As shown in FIG. 1, since the local connection interface 13 is locally connected to the user host computer 10, the local connection interface 13 has a connectivity restriction, i.e., the connection between the user host computer 10 and the scanner 11 is limited to a connection length and connection capacity of the local connection interface 13. Accordingly, in order to overcome such a connectivity restriction, technology has been developed in which the scanned image is transmitted to the user host computer 10 through a network. Such technology is disclosed in U.S. Pat. Nos. 5,911,044, 6,256,662, and 6,426,001, and U.S. Patent Publication No. 2001/0014908.

However, the technology of transmitting a scanned image to a user host computer, via a network, does not combine and use technology which uses a network session control and a local connection. Thus, users experience inconvenience when using such conventional technology.

Aspects of the present invention provide a scanning method and scanning system using a TWAIN driver, which can maximize convenience and utility of a scanner by performing duplex scanning in a scanner or a user host computer, which are both in a scanning system wherein the scanner and the user host computer are locally connected by an interface such as a universal serial bus (USB) or a parallel port, or are remotely connected via a network.

Aspects of the present invention also provide a method and system to transmit a scanned image from a scanner to an application of a user host computer via a network using a network session technology and a scanning control technology applied in a local connection.

An example embodiment of the present invention, provides a scanning method used to scan documents in a scanning system, the system including a scanner and a user host computer having a TWAIN driver, the scanner and the user host computer connectable by a local interface and a network, the method including selecting one of the local interface or the network to connect the scanner and the user host computer; if the network is selected, connecting the TWAIN driver to the scanner via the selected network to control the scanner; and performing scanning according to the selected local interface or the network.

According to an aspect of the present invention, the checking includes transmitting and receiving message data between the user host computer and the scanner in order to connect the user host computer and the scanner via the network.

According to an aspect of the present invention, the selecting includes selecting one of the local interface or the network via one of an operation panel of the scanner or the user host computer.

According to an aspect of the present invention, the user host computer pre-registers user information, corresponding user host computer information, and scan options in the scanner via the network, before the selecting of one of the local interface or the network.

According to an aspect of the present invention, the user information, corresponding user host computer information, and scan options can be registered by performing a search.

According to an aspect of the present invention, if the network is selected, the method further includes starting the performing of the scanning by inputting a command to the scanner to perform the scanning by a remote connection via the network, logging in by selecting a pre-registered user based on the pre-registered user information, and receiving an application list and a scan option value by using the registered user host computer information corresponding to the pre-registered user information.

According to an aspect of the present invention, if the network is selected, the method further includes indicating a list of scanners connected to the network and providing a graphic user interface (GUI) which enables a user to select a desired scanner from the list of scanners or select the desired scanner by directly inputting an IP address of the desired scanner, wherein the GUI is provided by one of the user host computer or the scanner.

Another example embodiment of the present invention provides a scanning system, including a scanner to scan a document, a user host computer connectable to the scanner by a local interface and a network, including a TWAIN driver to control the scanner, a scan manager, which discovers the scanner and registers user information, user host computer information, and scan options, such as scan resolution, in the discovered scanner, and a ScanToPC application, which receives the user information, the user host computer information, and the scan options from the scanner registered by the scan manager and operates a scan driver based on the user information, the user host computer information, and the scan options, and a network module, including a scanner discoverer, to transmit and/or receive data used by the scan manager to discover the scanner and interposed between the scan manager and the scanner, and a session controller, interposed between the ScanToPC application and the scanner to control a network connection of the ScanToPC application and the scanner.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

The above and other features and advantages of the present invention will become more apparent by describing in detail exemplary embodiments thereof with reference to the attached drawings in which:

FIGS. 6(A)-6(F) illustrate diagrams showing messages according to operations used in a scanning method and scanning system using a TWAIN driver according to an embodiment of the present invention, where FIG. 6(C) illustrates a connection message after a user logs in.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
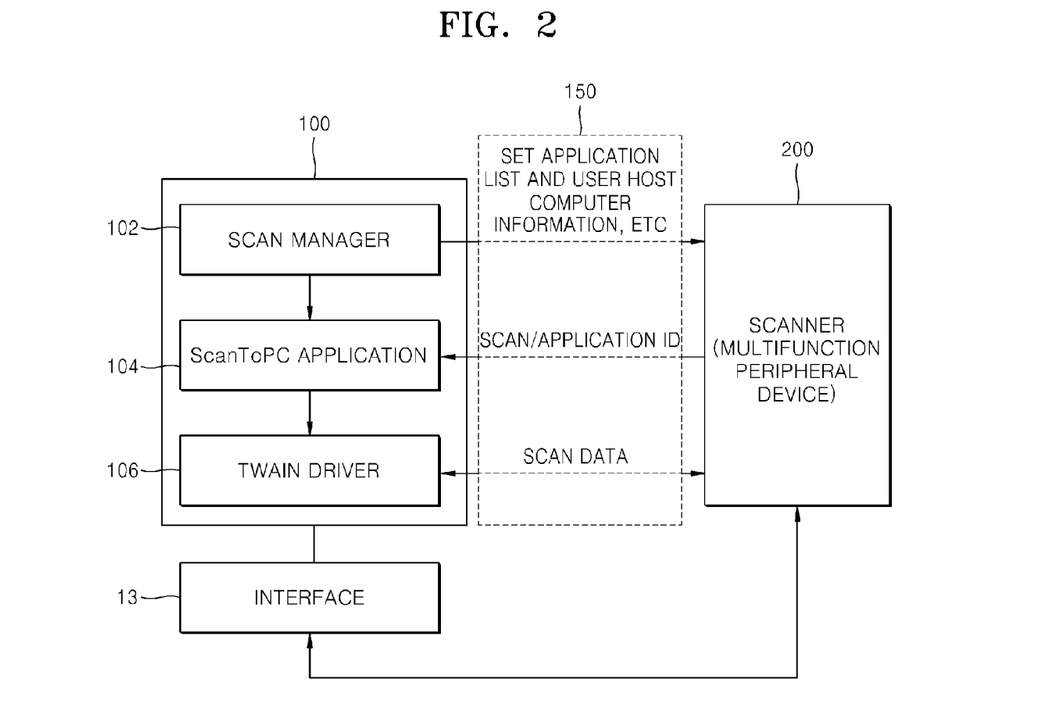
FIG. 2 is a diagram illustrating a scanning system using a technology without any interested name (TWAIN) driver according to an example embodiment of the present invention.
Figure 3:
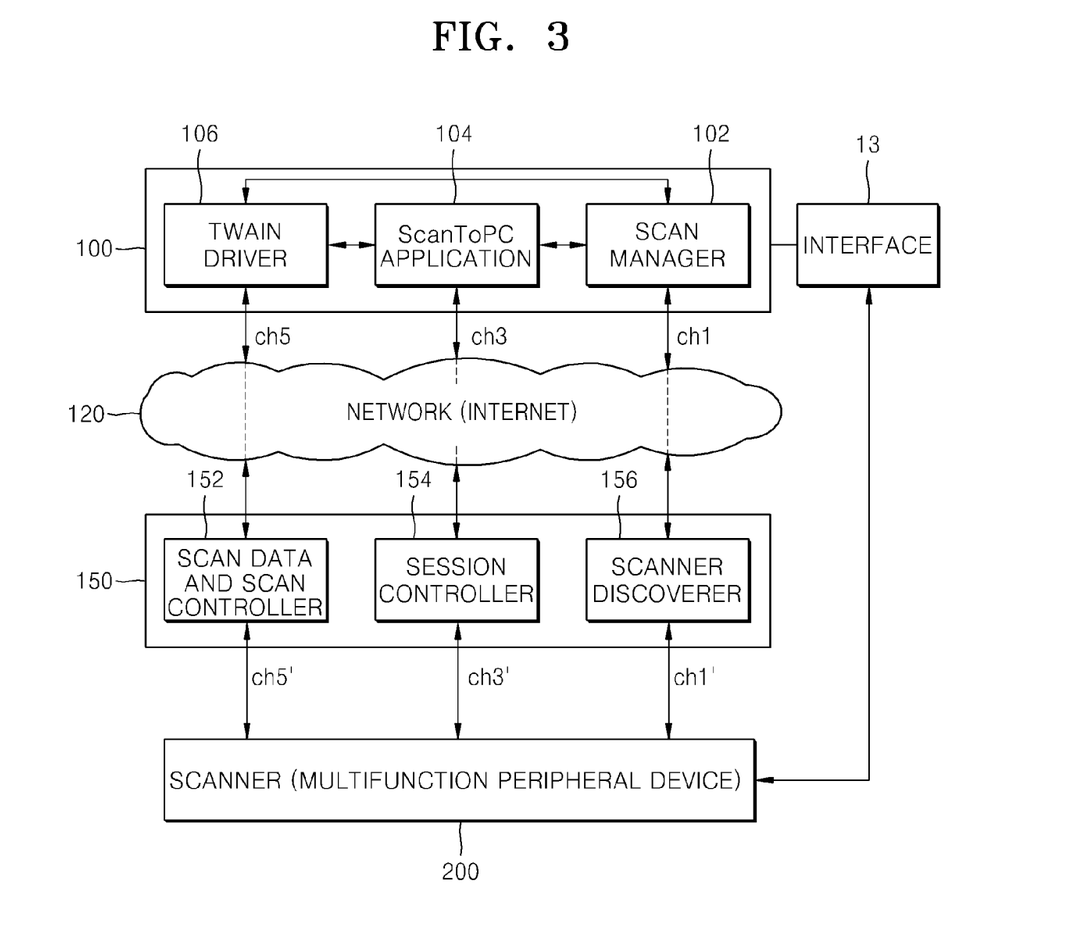
FIG. 3 is a diagram illustrating in detail the scanning system using a TWAIN driver illustrated in FIG. 2.
Figure 4:
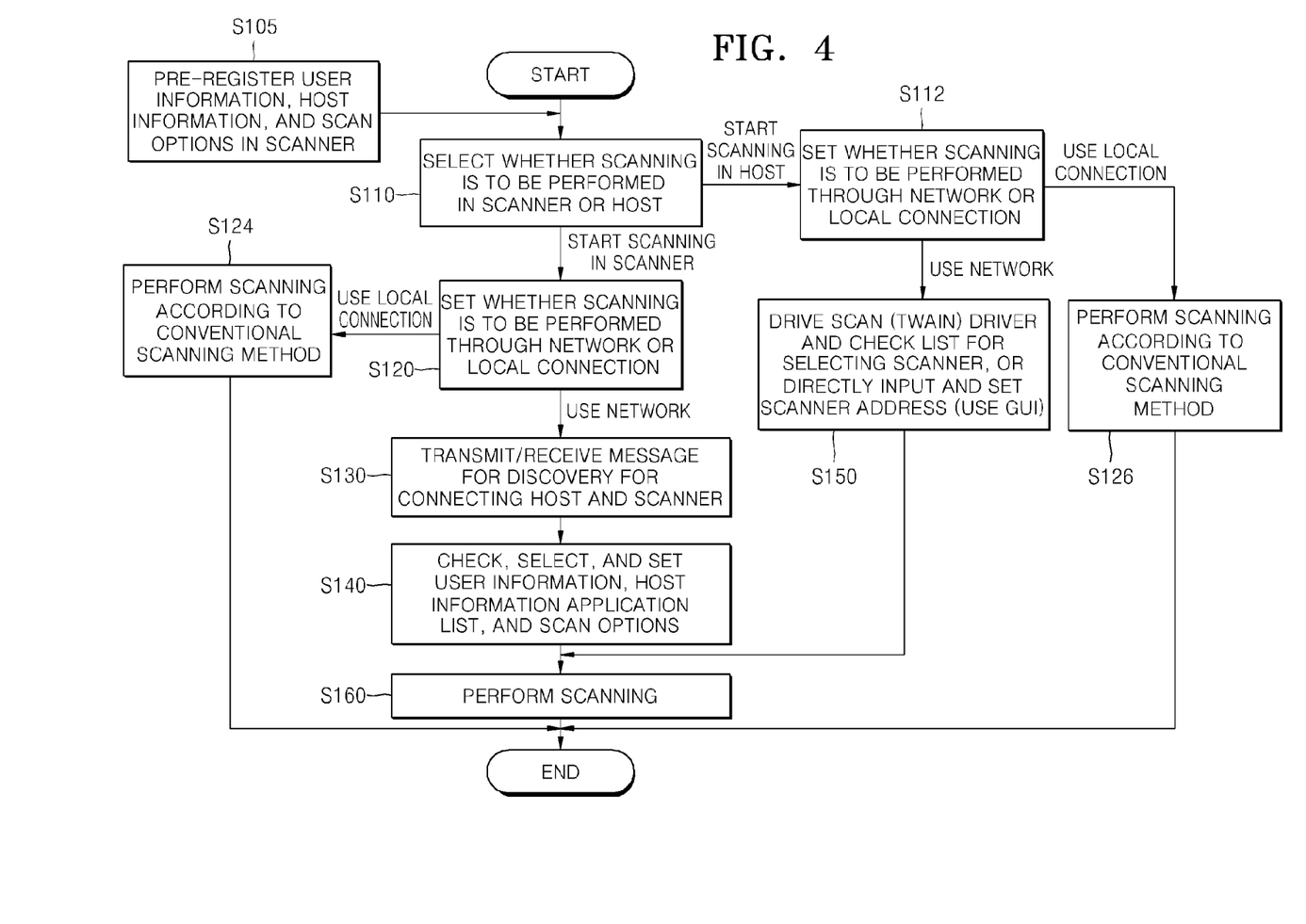
FIG. 4 is a flowchart illustrating a scanning method using a TWAIN driver according to an example embodiment of the present invention.
Figure 5:
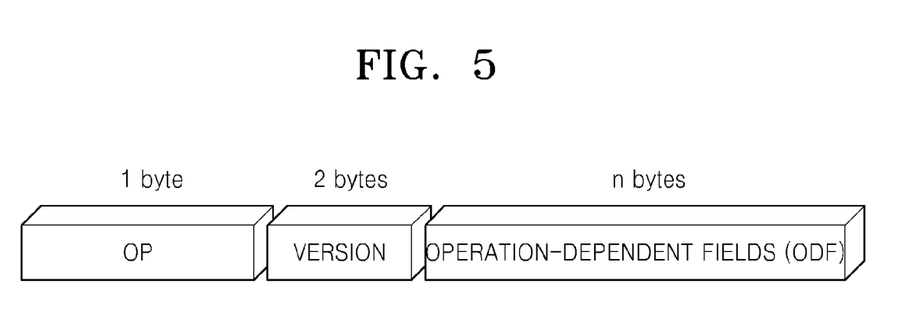
FIG. 5 is a diagram illustrating a message format used in a scanning method and a scanning system using a TWAIN driver according to an example embodiment of the present invention.
Figure 6A:
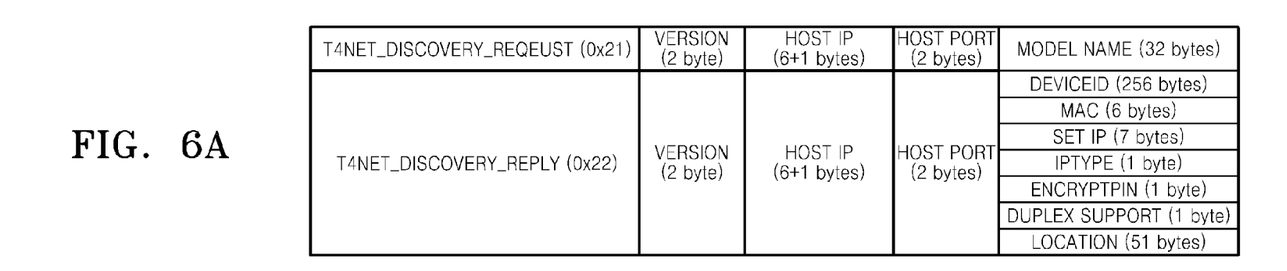
FIG. 6(A) illustrates a scanner discovery request message.
Figure 6B:
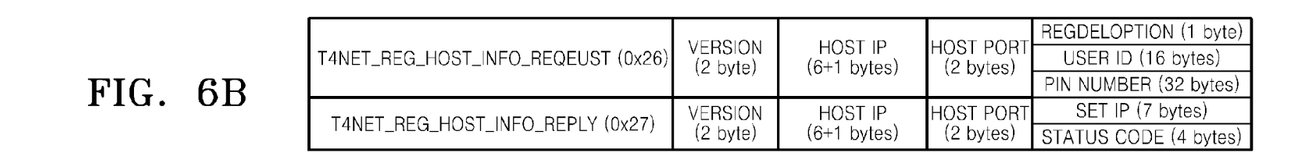
FIG. 6(B) illustrates a message of a ScanToPC supporting operation code.
Figure 6C:
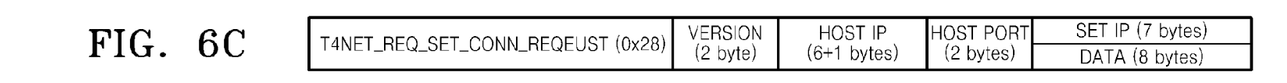
Figure 6D:
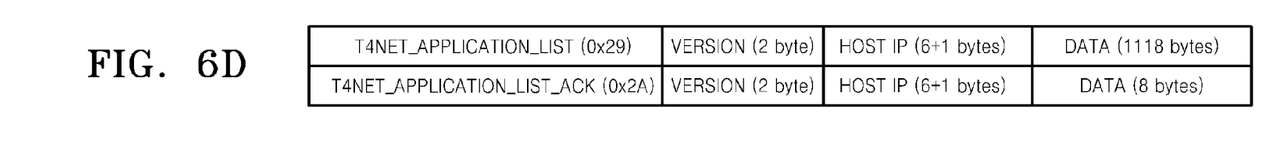
FIG. 6(D) illustrates a message to transmit an application list to a scanner.
Figure 6E:
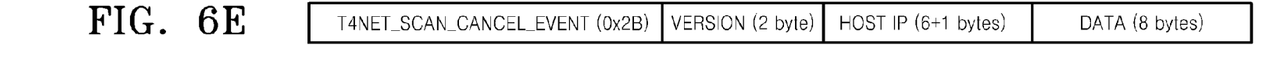
FIG. 6(E) is a message generated when a signal from a cancel button is inputted to a scanner.
Figure 6F:
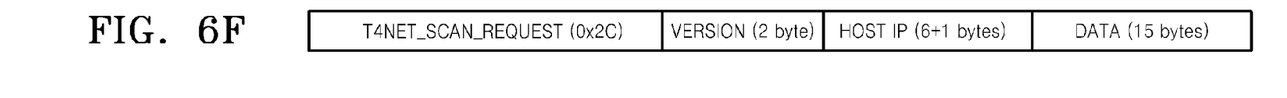
FIG. 6(F) is a message actually requesting scanning from a scanner to a user host computer.
Figure 7:
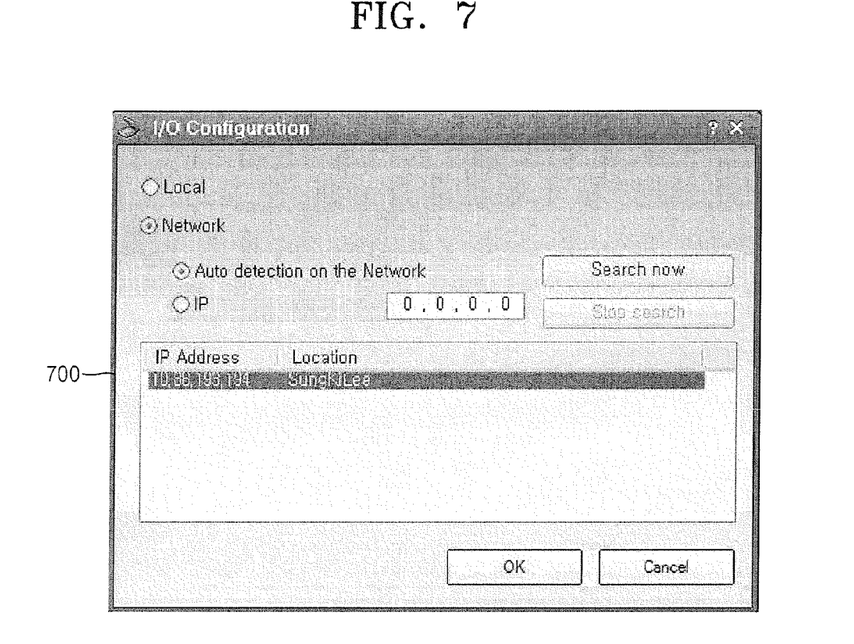
FIG. 7 is a diagram illustrating an input/output graphic user interface (GUI) screen provided by a scan manager of the scanning system illustrated in FIG. 2.

FIG. 2 is a diagram illustrating a scanning system using a TWAIN driver 106 according to an example embodiment of the present invention, and FIG. 3 is a diagram illustrating in detail the scanning system using the TWAIN driver 106 illustrated in FIG. 2. FIG. 4 is a flowchart illustrating a scanning method using a TWAIN driver according to an example embodiment of the present invention, and FIG. 5 is a diagram illustrating a message format used in the scanning method and the scanning system using a TWAIN driver according to an example embodiment of the present invention. FIGS. 6(A)-6(F) illustrate diagrams showing messages according to operations used in the scanning method and the scanning system using a TWAIN driver according to an embodiment of the present invention. Specifically, FIG. 6(A) illustrates a scanner discovery request message, FIG. 6(B) illustrates a message of a ScanToPC supporting operation code, FIG. 6(C) illustrates a connection message after a user logs in, FIG. 6(D) illustrates a message to transmit an application list to a scanner, FIG. 6(E) illustrates a message generated when a signal from a cancel button is inputted to a scanner, and FIG. 6(F) is a message actually requesting scanning from a scanner to a user host computer. FIG. 7 is a diagram illustrating an input/output graphic user interface (GUI) screen provided by a scan manager of the scanning system according to an example embodiment of the present invention.

Referring to FIGS. 2 and 3, the scanning system according to aspects of the present invention includes a scanner 200 and a user host computer 100 which are locally connected by an interface 13, also known as a local interface 13, such as a universal serial bus (USB) or a parallel port, or remotely connected via a network 120, in order to perform scanning. Accordingly, the scanning system includes a network module 150, which connects the user host computer 100 and the scanner 200 via a network 120. It is understood that the scanner 200 and the user host computer 100 are connectable to both the interface 13 and the network 120.

The user host computer 100 includes a scan manager 102, which discovers the scanner 200 that supports a network scan, i.e., discovers the scanner 200 which is capable of connecting to the user host computer 100 via the network 120, and registers user information, user host computer information, and scan options, such as a scan resolution, color, etc., in the discovered scanner 200. Also, the user host computer 100 includes a ScanToPC application 104, which receives the user information, the user host computer information, and the scan options registered in the scanner 200 by the scan manager 102. Furthermore, the user host computer 100 includes a TWAIN driver 106 which functions as a scanner driver and controls the scanner 200 based on the received user information, user host computer information, and scan options. According to aspects of the present invention, the TWAIN driver 106 can be used to control operations of the scanner 200 via a local connection or via the network 120. The TWAIN driver 106 generally controls scanning processes of the scanner 200, and receives and stores a scanned image.

The scan manager 102 will now be described in detail. The scan manager 102 is a network application of the user host computer 100, and discovers the scanner 200 that supports the TWAIN driver 106. Upon discovery of the scanner 200, the scan manager 102 assigns and registers user information, user host computer information, and scan options, such as the scan resolution, and a storage location in the user host computer 100, in the scanner 200.

The ScanToPC application 104 will now be described in detail. The ScanToPC application 104 is an application related to scanning of the user host computer 100. When a user starts scanning by selecting the user information and the scan options from the scanner 200, which is registered in the scanner 200 by the scan manager 102, the ScanToPC application 104 of the user host computer 100 receives a scanning start signal from the scanner 200 through the network 120 and activates the TWAIN driver 106 with the scan options. When the activated TWAIN driver 106 stores the scanned image in a corresponding location according to the scan options, the ScanToPC application 104 transmits the stored scanned image to another pre-designated application.

The network module 150 includes a scanner discoverer 156, which is interposed between the scan manager 102 of the user host computer 100 and the scanner 200 and transmits and receives data for scanner discovery in order to discover the scanner 200. Additionally, the network module 150 further includes a session controller 154, which is interposed between the ScanToPC application 104 and the scanner 200 and controls a connection between the ScanToPC application 104 and the scanner 200 via the network 200. Also, the network module 150 further includes a scan data and scan controller 152, which is interposed between the TWAIN driver 106 of the user host computer 100 and the scanner 200, and controls the transmission and reception of scan data and the scanning operation.

According to the scanning system of the present embodiment, the TWAIN driver 106 is installed in the user host computer 100 and driven by an application. The user host computer 100 detects the scanner 200 connected to the network 120, and connects the detected scanner 200 to the user host computer 100 itself. Also, in the scanning system according to the current embodiment, the scanner 200 calls and activates the TWAIN driver 106 through the network 120, which is a strength and specific feature of the scanning system according to aspects of the present invention. In other words, in a conventional scanning system, a user controls a scanner 11 (FIG. 1) and receives a scanned image through an interface 13 that is locally connected to a user host computer (10), but in the scanning system according to aspects of the present invention, the scanner 200 connected to the network (e.g., the Internet) 120 can also be discovered and controlled, or the scanner 200 can be connected and controlled by directly inputting an IP address to the user host computer 100. Also, the scanning system according to aspects of the present invention can start the scanning operation using the connected scanner 200 or using the TWAIN driver 106 of the user host computer 100.

General formats and a detailed structure of messages transmitted and received between the user host computer 100 and the scanner 200 via the network 120 will be described later with reference to FIG. 5 and FIGS. 6(A)-6(F). In the message format shown in FIG. 5, "OP" defines a type of an operation such as a request or a response and is an abbreviation of "operation," "VERSION" literally represents of the message, and "ODF" is a field that defines detailed contents depending on the "OP."

A scanning method using the TWAIN driver 106, realized in the scanning system according to aspects of the present invention, will now be described with reference to FIG. 4. Referring to FIG. 4, the scanning method begins by selecting whether the scanning will start in an operation panel of the scanner 200, a scan driver of the user host computer 100, or another application of the user host computer 100 at operation S110. Then, when the scanner 200 or the user host computer 100 is selected to start the scanning, the user then sets whether the scanning is to be performed by a remote connection via the network 120 or a local connection at operations S120 or S112, according to the selection at operation S110. If the user sets the scanning operation to be performed via a local connection at operation S120, the scanning operation is performed according to the conventional scanning method at operation S124. If the user sets the scanning operation to be performed via a local connection at operation S112, the scanning operation is performed according to the conventional scanning method at operation S126.

If the user sets the scanning operation to be performed by remote connection via the network 200 at operation S120, the scanning method preferably includes transmitting and receiving message data for discovery so as to connect the user host computer 100 and the scanner 200 via the network 120 at operation S130, logging in by selecting a pre-registered user, and checking, selecting, and setting an application list and a scan option value using the registered user host computer information at operation S140 when the scanning starts in the scanner 200. Then, the scanning operation is performed by the remote connection via the network 120 at operation S160.

Meanwhile, if the user sets the scanning operation to be performed by remote connection via the network 200 at operation S112, the host computer 100 drives the scan (TWAIN) driver 106 and displays a list of scanners connected to the network 120, and the user selects a desired scanner 200 from the list or directly inputs an IP address of the desired scanner 200 into the host computer 100, and sets the scanner 200 at operation S150. Once the scanner 200 is set at operation S150, scanning is performed at operation S160.

According to an aspect of the present invention, operation S110 is performed by manipulating a scan start button (not shown) of the scanner 200 or by controlling the TWAIN driver 106 of the user host computer 100. Also, the scanning method may further include pre-registering user information, user host computer information, and scan options from the user host computer 100 into the scanner 200 through the network 120 at operation S105. Alternatively, it will be obvious to one of ordinary skill in the art that the user information, user host computer information, and scan options can be registered in the scanner 200 through conventional operations of the user host computer 100 and the scanner 200.

Detailed embodiments of the scanning method and scanning system using the TWAIN driver 106 according to aspects of the present invention will now be described with reference to FIGS. 2, 3, and 7. In the scanning system, when the scanning starts in the scanner 200, as illustrated in FIGS. 2 and 3, the scanning operation may be performed by using the interface 13 which a local connection between the host computer 100 and the scanner 200, or by using the network 120. An advantage of the scanning system according to aspects of the present invention as compared to the conventional network shown in FIG. 1 is that when a user logs in by selecting a pre-registered user in the scanner 200 via the network 120, an application list and a scan option value are received by accessing a corresponding application of the user host computer 100 by using the registered user host computer information.

FIG. 7 illustrates an example of a graphic user interface (GUI) 700 provided by the scan manager 102 illustrated in FIG. 2. The GUI 700 searches for devices connected to the network 120, and displays responses from scanners that support a scan function in a list. A user can select the desired scanner 200 from the list displayed on the GUI 700, or can directly input an IP address of the desired scanner 200 into the GUI 700 to select the scanner 200.

A detailed embodiment of starting the scanning operation in the scanner 200 will now be described. As shown in FIGS.

2 and 3, the scan manager 102 is connected to the ScanToPC application 104, which in turn is connected to the TWAIN driver 106. The scan manager 102 provides the GUI 700 illustrated in FIG. 7. When the scan manager 102 transmits a scanner discovery request message 602, such as the request message "T4_NET_DISCOVERY_REQUEST" illustrated in FIG. 6(A), to the scanner 200 through a channel 1 labeled "ch1" illustrated in FIG. 3, the scanner discoverer 156, such as a 6000 port of a User Datagram Protocol (UDP) socket, of the network module 150 receives the scanner discovery request message 602 and transmits the scanner discovery request message 602 to the scanner 200 through "ch1". According to an aspect of the present invention, the scanner discovery request message 602 includes information that can be used to check the user host computer 100 and the scanner 200, such as model information, device ID information (DeviceID), media access control (MAC) information, device IP (SET IP) information, IP type (IPType) information, encoded personal identification number (EncryptPIN) information, duplex support information, and location information, as illustrated in FIG. 6(A).

The scanner 200 compares the model information included in the scanner discovery request message 602 and its own model information. When the scanner 200, which received the scanner discovery request message 602, determines that it is a scanner that supports the TWAIN driver 106 installed in the user host computer 100 which transmitted the scanner discovery request message 602, the scanner 200 transmits a response message 604, such as "T4_NET_DISCOVERY_REPLY" illustrated in FIG. 6(A), through the channel 1' labeled "ch1'" to the network module 150. When the response message 604 is transmitted to the network module 150, the scanner discoverer 156 of the network module 150 transmits the response message 604 to the scan manager 102 of the user host computer 100 through "ch1."

Besides the scanner discovery request message 602 and the response message 604, messages transmitted and received through the "ch1" may further include a request message 606, such as "T4_NET_REG_HOST_INFO_REQUEST" illustrated in FIG. 6(B), which is used to register user information and user host computer information via the scan manager 102, and a response message 608, such as "T4_NET_REG_HOST_INFO_REPLY" illustrated in FIG. 6(B), which the scanner 200 uses to respond to the request message 606. When the user logs in by selecting a user or the user host computer 100 registered in the scanner 200 to transmit a scanned image, a request message 610, such as "T4_NET_REQ_SET_CONN_REQUEST" illustrated in FIG. 6(C), is transmitted.

When "T4_NET_REQ_SET_CONN_REQUEST" is transmitted from the scanner 200 to the scan manager 102 of the user host computer 100 through the network module 150, the scan manager 102 activates the ScanToPC application 104. The activated ScanToPC application 104 transmits a message 612, such as "T4_NET_APPLICATION_LIST" illustrated in FIG. 6(D) to the scanner 200 through a channel 3 labeled "ch3" in order to register an application list, selected by the scan manager 102, in the scanner 200. In response to "T4_NET_APPLICATION_LIST", the scanner 200 transmits a message 614, such as "T4_NET_APPLICATION_LIST_ACK" illustrated in FIG. 6(D), to the user host computer 100 to acknowledge the message 612. Then, when a scan start button, installed on the scanner 200, is pressed after selecting a desired application from the application list, the scanner 200 transmits the value of the selected application and a scan option value to the ScanToPC application 104 by using a scan request message 618, such as "T4_NET_SCAN_REQUEST" illustrated in FIG. 6(F). When a cancel button (not shown), installed on the scanner 200, is pressed before pressing the scan start button, a cancel message 616, such as "T4_NET_SCAN_CANCEL_EVENT" illustrated in FIG. 6(E), is transmitted to the ScanToPC application 104 in order to cancel the pending scanning operation. When the cancel button is not pressed, the ScanToPC application 104 drives the TWAIN driver 106 by using the value of the selected application and the scan option value.

When the TWAIN driver 106 is activated, the TWAIN driver 106 connects to the scanner 200 through a channel 5 labeled "ch5" by using information about the scanner 200 received from the ScanToPC application 104, by using the scan option value as a default value, or by using a set value input through the GUI 700 illustrated in FIG. 7. After the TWAIN driver 106 is connected to the scanner 200, the TWAIN driver 106 controls scanning processes according to a conventional method, receives a scanned image, and stores the scanned image as a file according to the value of the selected application or transmits the scanned image to the corresponding application. Accordingly, all of the user host computers 100 connected to the network 120 can share, register, and use one scanner 200.

Starting the scanning operation in the user host computer 100 by using the TWAIN driver 106 will now be described. The user drives the TWAIN driver 106 in a desired image editing application and activates the scan manager 102. When the scan manager 102 is activated, the GUI 700 illustrated in FIG. 7 is provided, e.g., displayed on a screen of the user host computer 100 or a screen of the scanner 200. The user connects the TWAIN driver 106 to the corresponding scanner 200 by searching for the scanner 200 using the GUI 700, or by inputting an IP address of the scanner 200 that is to be connected to the network 120. After the TWAIN driver 106 is connected to the scanner 200, the TWAIN driver 106 controls the scanning processes according to a conventional method, receives a scanned image, and stores the scanned image as a file according to the value of the selected application or transmits the scanned image to the corresponding application. Accordingly, all of the user host computers 100 connected to the network 120 can share, register, and use one scanner 200.

According to the scanning method and scanning system using the TWAIN driver 106, convenience and utility of a scanning operation is maximized by performing duplex scanning using a scanner 200 or a user host computer 100, which are both in a scanning system wherein the scanner 200 and the user host computer 100 are locally connected, or remotely connected via the network 120.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, the scan manager 102 and ScanToPC APPLICATION 104 shown in FIG. 3 are not required to be separate components, and may instead be provided as a single component. Accordingly, it is intended, therefore, that the present invention not be limited to the various example embodiments disclosed, but that the present invention includes all embodiments falling within the scope of the appended claims. While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A scanning method used to scan documents in a scanning system including a scanner and a user host computer having a Technology Without An Interesting Name (TWAIN) driver, the scanner and the user host computer connectable by a local interface and a network, the method comprising:
   receiving a scanning request at the scanner or the user host computer;
   selecting one of the local interface or the network to connect the scanner and the user host computer; and
   performing duplex scanning and transmitting a scanning result via the selected local interface connection or network connection,
      wherein the duplex scanning in the scanner or the user host computer is performed by receiving the scanning request at the scanner or the user host computer,
      wherein when the scanning request is received at the scanner, the performing scanning and transmitting the scanning result comprises:
      receiving, by the scanner, user information from the user, the user information corresponding to pre-registered user information, and
      calling and activating, by the scanner, the TWAIN driver corresponding to the user information using an application selected by the user from an application list received at the scanner from the host computer.

2. The scanning method of claim 1, wherein when the network is selected, the method further comprises checking whether the scanner supports the TWAIN in the user host computer to perform the scanning according to the selected network.

3. The scanning method of claim 2, wherein the checking comprises transmitting and receiving message data between the user host computer and the scanner.

4. The scanning method of claim 3, wherein the message data comprises at least one of model information, device ID information, media access control (MAC) information, device IP information, IP type information, encoded personal identification number (PIN) information, duplex support information, and location information.

5. The scanning method of claim 1, wherein the selecting of one of the local interface or the network is performed via one of an operation panel of the scanner or the user host computer.

6. The scanning method of claim 1, further comprising using the user host computer to pre-register the user information, user host computer information, and scan options in the scanner via the network, before selecting one of the local interface or the network.

7. The scanning method of claim 1, wherein the user information, user host computer information, and scan options are registered by performing a search.

8. The scanning method of claim 6, wherein the activating of the TWAIN driver when the scanning request is received at the scanner, further comprises:
   starting the performing of the scanning by inputting a command to the scanner to perform the scanning by a remote connection via the network;
   logging in by selecting a pre-registered user based on the received user information; and
   receiving the application list and a scan option value at the scanner from the user host computer by using the pre-registered user host computer information corresponding to the pre-registered user information.

9. The scanning method of claim 1, wherein the connecting of the TWAIN driver when the scanning request is received at the user host computer from the user further comprises:
   indicating a list of scanners connected to the network; and
   providing a graphic user interface (GUI) which enables a user to select a desired scanner from the list of scanners or select the desired scanner by directly inputting an IP address of the desired scanner, wherein the GUI is provided by one of the user host computer or the scanner.

10. A scanning system, comprising:
   a scanner, connectable by a local interface and a network, to perform duplex scanning to scan a document;
   a user host computer connectable to the scanner by the local interface and the network, comprising:
   a TWAIN driver to control the scanner,
   a scan manager, which discovers the scanner and registers user information, user host computer information, and scan options in the discovered scanner; and
   a ScanToPC application, which receives from the scanner the user information, user host computer information, and scan options registered by the scan manager, and operates a scan driver based on the user information, user host computer information, and scan options; and
   a network module, comprising:
   a scanner discoverer to transmit and/or receive data used by the scan manager to discover the scanner, interposed between the scan manager and the scanner, and
   a session controller, interposed between the ScanToPC application and the scanner to control a network connection of the ScanToPC application and the scanner,
   wherein the duplex scanning in the scanner or the user host computer is performed by receiving the scanning request at the scanner or the user host computer;
   wherein when the scanning request is received at the scanner, the scanner receives user information from the user corresponding to pre-registered user information, and calls and activates the TWAIN driver corresponding to received user information by using an application selected by a user from an application list which is received at the scanner from the user host computer.

11. The scanning system of claim 10, wherein scanning is selectively performed by manipulating an operation panel of the scanner or by driving the TWAIN driver as the scan driver installed in the user host computer.

12. The scanning system of claim 10, wherein scanning is performed by using a remote connection via the network or the local interface when the scanning starts by manipulating an operation panel of the scanner or by driving the TWAIN driver as the scan driver installed in the user host computer.

13. The scanning system of claim 10, wherein the user information, the user host computer information, and the scan options are pre-registered in the scanner by the user host computer via the network.

14. The scanning system of claim 10, wherein the user information, the user host computer information, and the scan options are registered in the scanner.

15. The scanning system of claim 10, wherein the user host computer provides a graphic user interface (GUI), which displays a list of scanners connected to a network, and selects a desired scanner from the list of scanners or enables a user to directly select a desired scanner by inputting an IP address of the scanner.

16. A scanning system, comprising:
- a scanner to perform duplex scanning to scan a document;
- a user host computer comprising a TWAIN driver to control operations of the scanner;
- an interface to establish a local connection between the scanner and the user host computer; and
- a network module to establish a remote connection, via the network between the scanner and the user host computer,
- wherein the scanner performs the duplex scanning and transmits a scanning result to the user host computer via one of the local connection or the remote connection according to a user selection,
- wherein the duplex scanning in the scanner or the user host computer is performed by receiving the scanning request at the scanner or the user host computer; and
- wherein when the scanning request is received at the scanner, the scanner determines whether the scanner supports the TWAIN driver installed in the user host computer in order to perform the duplex scanning and when it is determined that the scanner supports the TWAIN driver, the scanner calls and activates the TWAIN driver corresponding to user information at the scanner by using an application selected by the user from an application list which is received at the scanner from the user host computer, the user information corresponding to pre-registered user information and the TWAIN driver is connected to the scanner.

17. The scanning system according to claim 16, wherein the scanner is discovered and selected among a plurality of scanners on the network based on a determination of whether the scanner supports the TWAIN driver.

18. The scanning system according to claim 17, wherein the user host computer further comprises:
- a scan manager, which discovers the scanner supported by the network and registers the user information, user host computer information, and scan options in the discovered scanner; and
- a ScanToPC application, which receives the user information, user host computer information, and scan options from the scanner registered by the scan manager and operates the TWAIN driver based on the user information, user host computer information, and scan options.

19. The scanning system according to claim 18, wherein scanning is selectively performed by entering a command into one of a graphical user interface (GUI) of the scanner or a graphical user interface (GUI) of the user host computer.

20. The scanning system according to claim 16, wherein the network module comprises:
- a scanner discoverer, to transmit and/or receive data to discover the scanner and interposed between the scan manager and the scanner, and
- a session controller, interposed between the ScanToPC application and
- the scanner to control a network connection of the ScanToPC application and the scanner.

21. A scanning method to scan a document in a scanning system, the system including a scanner and a user host computer having a TWAIN driver, the scanner and the user host computer connectable by a local interface and a network, the method comprising:
- inputting a command to scan a document to the scanner and the user host computer;
- connecting the scanner to the user host computer via the local interface or via the network, using the TWAIN driver; and
- performing duplex scanning according to the inputting operation and the connecting operation,
- wherein the duplex scanning in the scanner or the user host computer is performed in the scanner or the host computer by inputting the command at the scanner or the user host computer
- wherein when the command to scan the document is received at the scanner, calling and activating the TWAIN driver corresponding to user information by the scanner by using an application selected by the user from an application list which is received at the scanner from the user host computer, the user information corresponding to pre-registered user information.

\* \* \* \* \*

UNITED STATES PATENT AND TRADEMARK OFFICE
CERTIFICATE OF CORRECTION

| | | |
|---|---|---|
| PATENT NO. | : 8,941,860 B2 | Page 1 of 1 |
| APPLICATION NO. | : 12/047607 | |
| DATED | : January 27, 2015 | |
| INVENTOR(S) | : Dong-Keun Kim | |

It is certified that error appears in the above-identified patent and that said Letters Patent is hereby corrected as shown below:

Title Page, item (75), Column 1 (Inventors), Line 1:

Delete "Dong-koun Kim," and insert --Dong-Keun Kim,--, therefor.

In the Claims

Claim 10, Column 10, Line 32:

Delete "controller," and insert --controller--, therefor.

Signed and Sealed this
Seventh Day of July, 2015

Michelle K. Lee
*Director of the United States Patent and Trademark Office*